United States Patent [19]
Misato et al.

[11] 3,873,700
[45] Mar. 25, 1975

[54] FUNGICIDAL COMPOSITIONS AND METHOD FOR PROTECTING PLANTS BY THE USE THEREOF

[75] Inventors: Tomomasa Misato, Tokyo; Keng Tang Huang, Wako; Yasuo Homma, Kamifukuoka; Toshiro Shida, Lawasaki; Takashi Meguro, Zushi; Hachiro Wakamatsu, Musashino, all of Japan

[73] Assignees: Ajinomoto Co., Ltd., Tokyo; Ajinomoto Co., Ltd., Rikagaku, Kenkyusho, Japan

[22] Filed: June 1, 1973

[21] Appl. No.: 366,094

[30] Foreign Application Priority Data
June 6, 1972  Japan..........................47-56348

[52] U.S. Cl. ............................................. 424/199
[51] Int. Cl............................................. A01n 9/36
[58] Field of Search ..................................... 424/199

[56] References Cited
UNITED STATES PATENTS
2,465,335  3/1949  Burkhard...................... 424/199 X FOREIGN PATENTS OR APPLICATIONS
431,759  4/1934  United Kingdom OTHER PUBLICATIONS
Renshaw, et al., Chem. Abst. Vol. 4, (1910) p. 1756.

Primary Examiner—Jerome D. Goldberg
Assistant Examiner—Allen J. Robinson
Attorney, Agent, or Firm—Sherman & Shalloway

[57] ABSTRACT

Fungicidal compositions for agricultural and horticultural use which contain as an active ingredient thereof the phosphatides and a method for protecting plants by the use thereof. These compositions exhibit excellent protective effects against attack by plant disease fungi or bacteria and have no phytotoxicity, no mammalian toxicity and no risk of causing the pollution of soil, or harming humans, cattle and poultry.

3 Claims, No Drawings

FUNGICIDAL COMPOSITIONS AND METHOD FOR PROTECTING PLANTS BY THE USE THEREOF

This invention relates to fungicidal compositions or agents which exhibit excellent fungicidal effects and in which there is no risk of pollution being caused thereby; and to a method for the use thereof. More particularly, the present invention relates to fungicidal compositions for agricultural and horticultural use which comprise or consist of fungicidal amounts of phosphatides (phospholipides), preferably a phosphatide selected from the group consisting of soybean lecithin, rapeseed lecithin and egg lecithin, as an active ingredient, and a solid or liquid carrier.

The term "fungicidal composition or agent," as used herein and the appended claims, is meant also to include bactericidal compositions or agents.

Compounds of heavy metals such as copper, mercury and arsenic, as well as the organophosphorus and organochlorine compounds have been used for the control of plant diseases, but these fungicides have never been completely satisfactory because of their pollution of the soil strong phytotoxicity, residual toxicity in food crops, high mammalian toxicity or irritative effects on the human skin and eye.

We have conducted our extensive research seeking a compound which, while not possessing any of the foregoing faults of the conventional fungicides, would exhibit preventive effects against fungal plant diseases. We have now found that the readily available and inexpensive phosphatides, which are known as nutritional substance, exhibit excellent preventive effects against numerous plant diseases. The diseases include rice blast and rice leaf blight, which are the main diseases of the rice plant, citrus melanose, cucumber anthracnose, cucumber phytophthora rot, cucumber powdery mildew, cucumber downy mildew, tomato leaf mold, tomato late blight, tomato leaf spot and others. The phosphatides have no phtotoxicity and have an extremely low mammalian toxicity. Moreover there is no risk of causing the pollution of soil and plants, or harming human beings cattle, or poultry.

The phosphatides possess substantially no mammalian toxicity as can be readily appreciated from the fact that they are widely used in the food industry by being incorporated in, for example, margarine, chocolate, ice cream, bread, biscuits, crackers, macaroni, edible oils and fats, as well as being utilized in medical field as anti-cholesterol preparations. Hence, the safety of using phosphatides is exceedingly great, with the consequence that though they may be residually present in crops, the crops can be directly used as human food or a cattle and poultry feed, or the crops may first be simply washed. Thus it becomes possible to use the invented composition up to immediately before the harvesting period, a practice which has been avoided in case of the conventional fungicidal compositions. The invented compositions can be applied with especial convenience up to the time of harvesting of such plants as fruit-bearing plants, berry-bearing plants and vegetables, including citrus, persimmon, apple, pear, peach, plum, apricot, cherry, loquat, grape, fig, pineapple, banana, strawberry, olive, tomato, eggplant, pepper, cucumber, melons, watermelon, pumpkin, radish, cabbage, cauliflower, turnip, onion, asparagus, lettuce, carrot, celery, spinach, dasheen, ginger, pea, potato, beans, rice, barley, wheat, etc.

It is therefore an object of the present invention to provide a fungicidal composition for agricultural and horticultural use which contains a phosphatide (phospholipide) as its active ingredient and which exhibits excellent fungicidal effects while demonstrating no phytotoxicity, no mammalian toxicity and no risk of its becoming a cause of pollution.

Another object of the invention is to provide an improved method for protecting agricultural and horticultural plants from attack by plant disease fungi or bacteria.

It is especially preferred that the phosphatide to be used as the active ingredient in the present invention be one which has been derived from a natural source. As this natural source, there can be named such plant and animal sources as soybean, corn, peanut, bird eggs and the like. Especially preferred is the utilization of soybean lecithin and/or egg lecithin. It has not been previously known that the phosphatides per se had substantial fungicidal effects and that they could be used as the active ingredient of fungicidal compositions for protecting agricultural and horticultural plants from attack by plant disease fungi or bacteria.

The phosphatides that are to be used as the active ingredient in this invention are readily available in great quantities and at low cost. Furthermore, they are completely harmless to man, and domestic animals and fowl, and there is no need to exercise any special caution in their handling. Again, there is no possibility of their causing pollution of the environment. Further, as previously noted, their application to crops right up to the time the crops are to be harvested can be carried out with complete safety. In addition, water, the most available medium, can be used for dispersing and providing a stable emulsion, and since they, as a surfactant, conjointly possess the properties of spreading on and penetrating plants, there is also the incidental advantage that the necessity of especially incorporating such surfactants as dispersing agents, spreading agents and emulsifiers, which are usually used in the preparation of agricultural chemicals, is obviated.

Phosphatides of good quality as well as crude phosphatides containing fats may be used in this invention. Further, they also may be used in the form of a suitable nontoxic salt.

The active ingredient of the present invention is especially useful in controlling the following fungi (and bacteria) which tend to attack food crops: *Pyricularia oryzae*, the causative organism of rice blast; *xanthomonas oryzae*, the causative organism of bacterial leaf blight; *Xanthomonas citri*, the causative organism of citrus canker; *Colletotrichum lagenarium*, the causative organism of cucumber anthracnose; *Phytophthora parasitica*, the causative organism of cucumber phytophthora rot; *Sphaerotheca fuliginea*, the causative organism of cucumber powdery mildew; *Pseudoperonospora cubensis*, the causative organism of cucumber downy mildew; *Cladosporium fulvum*, the causative organism of tomato leaf mold; *Phytophthora infestans*, the causative organism of tomato late blight; *Septoria lycopersici*, the causative organism of tomato leaf spot, and others.

The active ingredient of the fungicides of the present invention may be directly applied to the fungus-susceptible plant surface, or it may be applied thereto in any formulation such as granules, dusts, emulsifiable concentrates, wettable powders, pastes, oil agents, aerosols, fogs or fumigants with suitable solid carriers, liquid carriers, emulsifying and dispersing agents and the like, as in the case of the usual formulations well known in the art. Examples of these carriers include clay, kaolin, bentonite, acidic terra alba, diatomaceous earth, calcium carbonate, nitrocellulose, starch, acacia, carbon dioxide, Freon and the like. Also, while exactly not necessary, the active ingredient may be suitably compounded with those auxiliary agents which are usually employed in the formulation of fungicides, e.g., surface active agents which serve as a spreading, dispersing and emulsifying agent. Examples of such surface active agents are soap, higher alcohol sulfate, alkyl sulfonate, alkylaryl sulfonate, quaternary ammonium salts, polyalkylene oxide and the like. The preferred concentration of the active ingredient in the fungicidal composition is about 0.1 – 90 % by weight. However, the concentration may be suitably varied in accordance with the intended use of the fungicide.

The amount of the fungicidal composition to be applied may be varied according to such factors as the formulation of the composition, the class of the active ingredient or the concentration of the active ingredient in the composition. It is usually applied at the rate of about 10 grams per 10 ares to 2,000 grams per 10 ares, and preferably 50 grams per 10 ares to 1,000 grams per 10 ares, calculated as the active ingredient. However, greater amounts may be applied, if desired. An are is defined as 100 square meters.

The active ingredient of this invention may also be employed in admixture with herbicides, insecticides, other fungicides, soil conditioners, and fertilizers such as urea, ammonium sulfate, ammonium phosphates, potassium salts and the like.

Next, examples of the preparation of the invention fungicidal composition for agricultural and horticultural use will be given. In the examples the parts are on a weight basis.

PREPARATION EXAMPLE 1

98 Parts of water were added to 2 parts of soybean lecithin (a product of Ajinomoto Company) and, after allowing the mixture to stand for 30 minutes, it was vigorously stirred to obtain 100 parts of an emulsion of 2 % concentration.

PREPARATION EXAMPLE 2

Two parts of soybean lecithin were mixed with 98 parts of talc to obtain 100 parts of a powder preparation.

PREPARATION EXAMPLE 3

Ten parts of soybean lecithin were dispersed in 90 parts of ethanol to obtain 100 parts of a solvent preparation.

PREPARATION EXAMPLE 4

Ten parts of soybean lecithin, 15 parts of starch and 75 parts of bentonite were mixed and comminuted to obtain 100 parts of a granular preparation.

PREPARATION EXAMPLE 5

90 Parts of water were added to 10 parts of commercially available yolk lecithin and, after allowing the mixture to stand for 30 minutes, it was emulsified by stirring, to obtain 100 parts of an emulsion.

Next, the effects of preventing the various plant disease fungi by use of the invention fungicidal composition for agricultural and horticultural use will be specifically illustrated.

APPLICATION EXAMPLE 1

Test for evaluating the effectiveness of preventing rice blast disease.

Rice stubbles (variety "Jukkoku") were planted in synthetic resin pots of 6 cm in diameter, ten stubbles being planted per pot, and were grown in a greenhouse. The emulsion prepared in accordance with Preparation Example 1, after dilution with water to a concentration of 1,000 ppm, was applied to the rice plant seedlings of the 4-leaf stage at the rate of 50 ml per pot with a sprayer. After the applied emulsion had dried, spores of rice blast (Pyricularia oryzae), which had been cultivated in a chaff culture medium containing powder yeast extract, soluble starch, saccharose and chaff, were suspended in water and sprayed on the rice plant seedlings uniformly. The thus treated seedlings were then placed in an inoculation box at 27°C. and relative humidity of above 95 % to be infected with the foregoing fungus. Four days after infection, the number of disease lesions per leaf was counted, and the preventive value was calculated as follows:

Preventive value (%) = (Number of disease lesions of untreated leaf) − (Number of disease lesions of treated leaf)/(Number of disease lesions of untreated leaf) × 100

The results obtained are shown in Table 1.

Table 1

| Compound tested | Average number of disease lesions per leaf | Preventive value (%) | Phytotoxicity |
| --- | --- | --- | --- |
| lecithin | 8.9 | 74 | —* |
| control | 34.2 | 0 | |

(Note)
—* : No phytotoxicity was observed.

Similar results were obtained when yolk lecithin was used as the lecithin.

APPLICATION EXAMPLE 2

Test for evaluating the effectiveness of preventing rice leaf blight.

Rice plant seedlings of the 5 – 6-leaf stage grown in a greenhouse as in Application Example 1 were sprayed with an emulsion prepared in accordance with the Preparation Example 1, which was diluted such that concentration of the compound tested was 1,000 ppm, the application being at the rate of 40 ml per pot. After the applied emulsion had dried, cells of bacterial leaf blight (Xanthomonas oryzae) cultivated in a bacterial leaf blight culture medium at 27°C. for 3 days were suspended in water and inoculated by needle to the highest and the second highest leaves of the rice plant. In two or three weeks after inoculation the leaves were infected with the foregoing fungus. The length of the disease lesions per stalk was then measured, and the preventive value was calculated as follows: Preventive value (%) = (Length of disease lesions of untreated leaf) − (Length of disease lesions of treated leaf)/(Length of disease lesions of untreated leaf) × 100

The results obtained are shown in Table 2.

Table 2

| Compound tested | Length of disease lesions per stalk (mm) | Preventive value (%) | Phytotoxicity |
| --- | --- | --- | --- |
| lecithin | 75 | 70 | — |
| CONTROL | 225 | 0 | |

APPLICATION EXAMPLE 3

Test for evaluating the effectiveness of preventing cucumber downy mildew.

Cumcumber seeds (variety "Shinhikari No. A") were planted at the beginning of October, three seeds being planted per seed-bed, and they were grown in a greenhouse constructed of vinyl resin sheets. This experiment was performed as three-repeated cultivations. Using these cucumber seedlings, an emulsion prepared in accordance with Preparation Example 1 and diluted with water to a concentration of 1,000 ppm was sprayed on the leaves of the seedlings with a shoulder-borne sprayer on four occasions: Apr. 30, May 6, 12 and 19, ensuring that both sides of the leaves were throughly wetted on each occasion. The thus treated test plants were left to spontaneous infection. On the 23rd of May, the state of infection was examined with respect to both sides of the leaves from the 11th to the 20th leaf, and the preventive value was then calculated as follows:

Preventive value (%) = (Number of leaves infected in untreated plant) − (Number of leaves infected in treated plant)/(Number of leaves infected in untreated plant) × 100

The results obtained are shown in Table 3.

Table 3

| Compound tested | No. of leaves infected (outside) | Preventitive value (%) | No. of leaves infected (inside) | Preventitive value (%) | Phytotoxicity |
| --- | --- | --- | --- | --- | --- |
| lecithin | 9 | 40 | 9 | 47 | — |
| control | 15 | 0 | 17 | 0 | |

APPLICATION EXAMPLE 4

Test for evaluating the effectiveness of preventing Citrus melanose.

a. Test plant.

Shoots of about 3-year old seedlings of citrus "Unshu" (2 - 4 trees planted in 7-inch pots)

b. Solution used for test.

The plants were uniformly sprayed with a dilute solution (concentration of compound tested = 1,000 ppm) of an emulsion prepared in accordance with Preparation Example 1, at the rate of 40 ml per two pots.

c. Inoculum and method of inoculation.

In preparing a suspension of pycnospores, sterile distilled water was poured on culture twigs infected with citrus molanose in a test tube. A suspension containing about 200 pycnospores seen in the field of view of a 150-power microscope was obtained, and the test plants were inoculated by spraying. After completion of the inoculation, the test plants were placed in an inoculation box and held in a humid chamber for 3 days. After the plants had been thoroughly infected, they were transferred to a greenhouse.

d. Method of inspection.

About 2 - 3 weeks after inoculation, the entire leaves of the shoots were inspected for the development of disease, and the states of infection were evaluated and given the following ratings:

| Number of disease spots | Rating |
| --- | --- |
| No spots | 0 |
| 1 - 50 disease spots | 1 |
| 51 - 150 disease spots | 2 |
| 151 or more disease spots | 3 |

The extent of infection and preventive value were then calculated as follows:

Extent of infection = $(1 \times n_1) + (2 \times n_2) + (3 \times n_3)/(3 \times N) \times 100$ where $n_1$, $n_2$ and $n_3$ are each the number of leaves whose states of infection were respectively rated as being 1, 2 and 3; and N is the total number of leaves.

Preventive value (%) = (Extent of infection of untreated leaves) − (Extent of infection of treated leaves)/Extent of infection of untreated leaves × 100 e. The results of the test are shown in Table 4.

Table 4

| Compound tested | Extent of infection | Preventive value (%) | Phytotoxicity |
| --- | --- | --- | --- |
| lecithin | 24 | 54 | — |
| control | 52 | 0 | |

What is claimed is:

1. A method for combatting plant fungus which comprises applying to said fungus a fungicidally effective amount of a composition consisting essentially of from 0.1 to 90% by weight based on the weight of the composition of a phosphatide selected from the group consisting of soybean lecithin, corn phosphatide, peanut phosphatide and egg lecithin and an inert carrier.

2. The method of claim 1 wherein said composition is in aerosol form.

3. The method of claim 1 wherein said carrier is a solid selected from the group consisting of clay, kaolin, bentonite, acidic terra alba, diatomaceous earth, calcium carbonate, nitrocellulose, starch, acacia and talc.

* * * * *